United States Patent [19]

Koikawa et al.

[11] 4,245,316

[45] Jan. 13, 1981

[54] SYSTEM FOR PROVIDING TIME CONTROL DATA IN A NUMERICAL CONTROL SYSTEM

[75] Inventors: Noriyuki Koikawa; Tetsuo Ohkubo; Masashi Kawasumi, all of Tokyo, Japan

[73] Assignee: OKI Electric Industry Co., Ltd., Tokyo, Japan

[21] Appl. No.: 916,223

[22] Filed: Jun. 16, 1978

[30] Foreign Application Priority Data

Jun. 29, 1977 [JP] Japan ................................ 52-76591

[51] Int. Cl.³ ................................................ G06F 15/46
[52] U.S. Cl. ................................ 364/474; 340/680;
 364/119; 364/569; 364/900
[58] Field of Search ............... 364/107, 119, 474, 475,
 364/551, 552, 569, 200 MS File, 900 MS File;
 318/563, 565; 340/679, 680; 73/104, 112;
 324/181, 186, 189; 235/92 PD, 92 T; 346/17,
 20, 33 R, 33 MC

[56] References Cited

U.S. PATENT DOCUMENTS

| 3,555,516 | 1/1971 | Proctor | 364/200 |
|---|---|---|---|
| 3,689,839 | 9/1972 | Cother | 324/181 |
| 3,809,870 | 5/1974 | Auble et al. | 73/104 |
| 3,882,305 | 5/1975 | Johnstone | 364/551 |
| 3,914,996 | 10/1975 | Davis et al. | 364/569 X |
| 4,051,351 | 9/1977 | Mallick, Jr. et al. | 340/680 X |

*Primary Examiner*—Joseph F. Ruggiero
*Attorney, Agent, or Firm*—Frailey & Ratner

[57] ABSTRACT

In a numerical control machine tool, the time that the tool or bit actually operates is counted in the control device of the numerical control system. The present time control data collection system comprises a data memory having a plurality of flags, the condition of each of which reflects the actual operation of the related tool or bit, a real time clock which provides signals at predetermined intervals, and means for counting the real time clock on the condition that the particular flag in said memory is on. The counted value is displayed either directly, or the fact that the counted value exceeds the predetermined reference value is indicated. The present system can also be implemented using a programmed micro-computer.

8 Claims, 4 Drawing Figures

SYSTEM FOR PROVIDING TIME CONTROL DATA IN A NUMERICAL CONTROL SYSTEM

BACKGROUND OF THE INVENTION

The present invention relates to a low cost and practical tool control system and compilation of operational records of the stored program system numerical control equipment. Abrasion losses and cutting quality of bits used by machine tools are directly related to the resultant accuracy of finishing and surface roughness of the workpiece. Precise control of the condition of these tools is essential to the machining process. Theories, research, and measuring methods related to cutting conditions including life of tools, bit feed, spindle revolution, etc. have been published in many publications.

However, there have been considerable differences among the experimental data and the results of measurements. The technologies involved are complex and require high cost detectors or measuring instruments and, therefore, are not practical. Among other systems, the system with application of DNC (Direct Numerical Control) can be said to be the most practical. In this system, numerically controlled machine tools (to be called NC machine tools hereinafter) and the host computer for direct numerical control are on-line. On the host computer side, either the spindle-on-time is calculated as the first method, or the automatic operating time of the NC machine tool is calculated as the second method, and through these processes the working time of tools is calculated and controlled. As the third method, the spindle-on-time is calculated by attaching to the numerical control device an integrating indicator, which simply calculates spindle-on-time.

However, the first and third methods have shortcomings such as calculation of idle time and high cost of additional equipment. Even if the spindle is revolving, spindle revolution is not necessarily an indication of cutting operation since the operator may have halted automatic operation, inspecting the surface of the workpiece or cleaning the cutting area. The second method involves calculation of time which can be hardly termed as actual working time of a given tool. It involves calculation of idle time including the time for making preparations for the machining process such as locating time with a high speed feed and tool change time. If the objective is to control each tool, the data obtained through these methods cannot be used as they are, since, in effect, they represent operating time of the NC machine tool in operation or the spindle-on-time.

The fact that the equipment employed for these first, second, and third methods are complex and costly cannot be denied. Since the production control department must focus on cost reduction of products, it is of course very helpful to identify real working time of tools and operating time of NC machine tools under the current circumstances where development of tools is showing a remarkable progress.

SUMMARY OF THE INVENTION

The objective of the present invention is to provide an innovative system for obtaining time controlling data without the addition of special equipment as observed in a prior art. Another objective of the present invention is to provide a system which makes it possible to calculate time for actual operation of tools and devices, which calculation is distinct from the rough calculation of a prior art.

The above and other objects are attained by a system for providing time control data in a numerical control system comprising a data memory having at least a plurality of flags, a real time clock which provides signals at predetermined intervals, an input device which inputs command information to said memory, a display/alarm device which is capable of displaying the content of said memory and of giving warning, means for counting said real time clock on the condition that the particular flag in said memory specified by the command information is ON and applying the result of the counting to said display/alarm device, and a control device for controlling the operation of the above elements.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

The stored program numerical control device incorporates software or hardware required for the control of machine tools comprising a central processing unit, control program memory, data memory, display unit, interpolation function, speed control function, etc.

Figure 1:
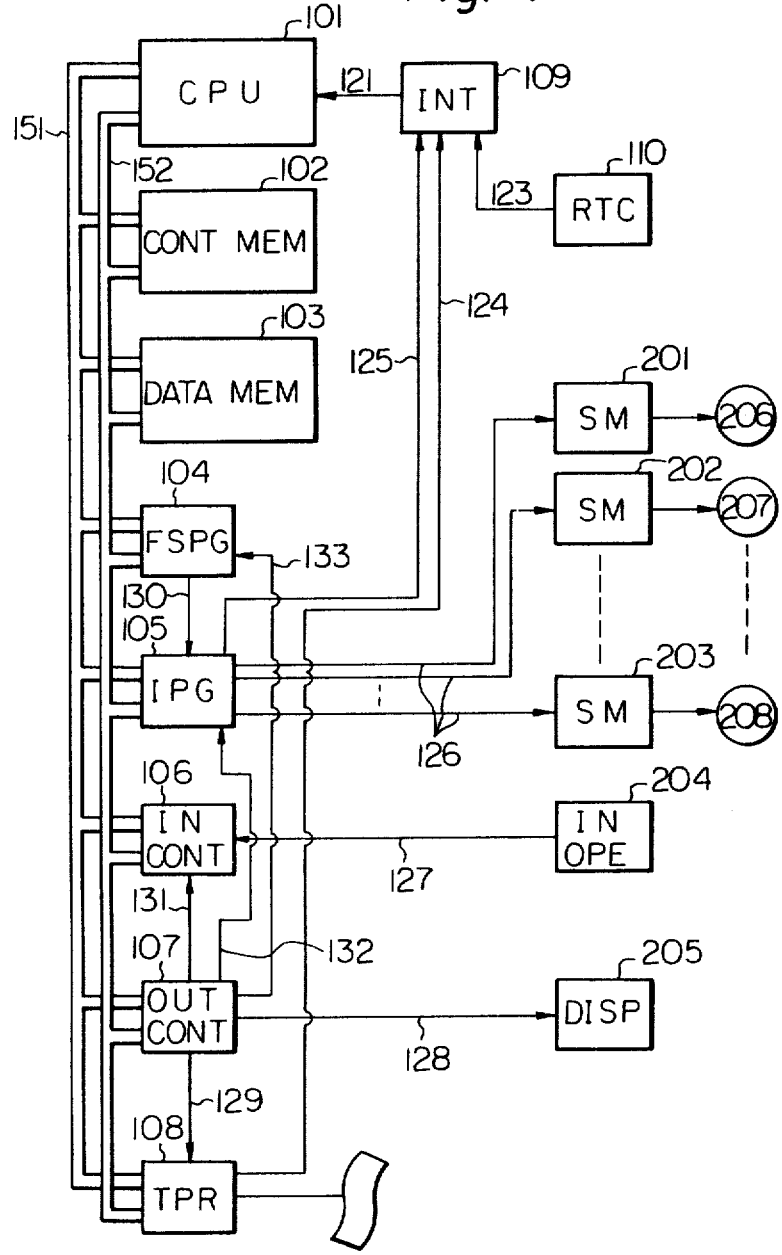
FIG. 1 illustrates a brief outline of the stored program system numerical control device according to the present invention.

FIG. 1 illustrates one embodiment of the stored program numerical control device according to the present invention. The central processing unit (to be called CPU hereinafter) 101 is connected via a control program memory (to be called control memory hereinafter) 102, data memory 103, feedspeed pulse generator 104, interpolation pulse generator 105, input control unit 106, output control unit 107, tape reader 108, address bus line 151, and data bus line 152.

CPU 101 reads out the program stored in the control memory 102. This program commands the various devices 103-108 connected to the address bus line 151 and data bus line 152, and proceeds with each step of the program in sequence. The CPU 101 is connected to the interruption control circuit 109 and has the function of changing the flow of the program by interruption. This interruption control circuit is connected to a real time clock (to be called RTC hereinafter) 110, interpolation pulse generator 105, and paper tape reader 108 by the lines 123, 125, and 124 respectively, and has the function of putting the causes of interruption in order and of passing these on to the CPU 101.

The servo-mechanism 201, 202, 203 receives command pulses from the interpolation pulse generator 105 via the lines 126 and drives the motors 206, 207, and 208 of the respective spindles of the machine tool equipped with tools. The feed speed pulse generator 104 and interpolation pulse generator 105 are connected with the line 130. Interpolation pulse generator 105 provides a command pulse, which is controlled by the feed speed pulse generated by the feed speed pulse generator 104 and output via the line 130, to the servo mechanism 201, 202, and 203. The input control unit 106 receives the signals coming in, through the track group 127, from the switches and push-buttons of the operation panel of the CPU 101, and the input operation device 204 of the micro-switches and proximity switches provided to the aforementioned machine-tool. By these input signals the CPU judges the prevailing situation. The output control unit 107 provides output signals via the line 128 to the display and/or alarm device 205 comprising the alarm lamp and display device or solenoid of the aforementioned machine tool. It also provides drive signals via the line 129 to the tape reader 108. It further provides signals to the input control unit 106 via the line 131 in order to switch the input signal. Or, it outputs control signals via the line 132, such as the signal that designates the spindle, which outputs the aforementioned command pulse to the interpolation pulse generator 105. Or, it outputs the signal via the line 133 that controls the feed speed pulse generator 104.

Figure 2:
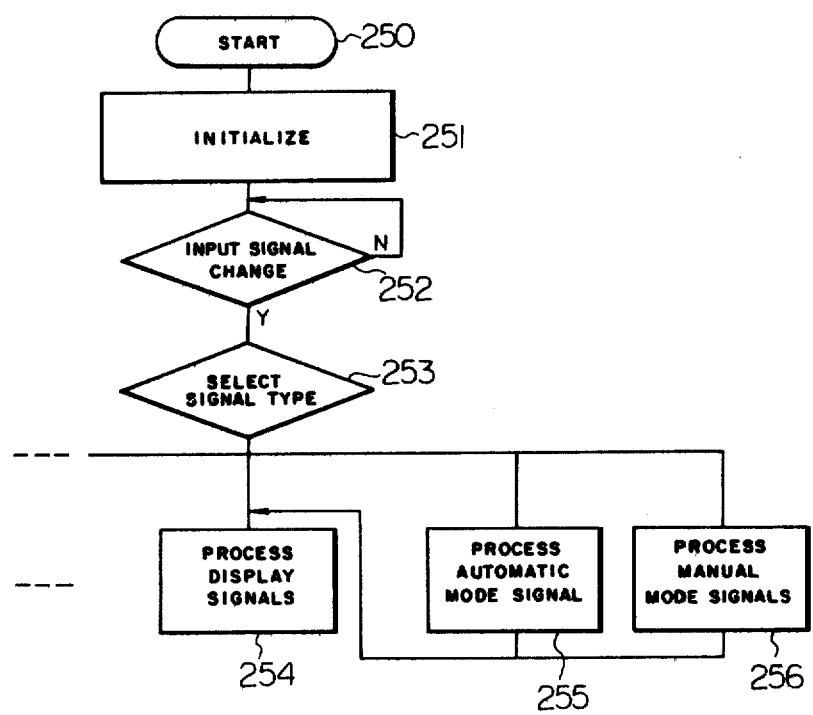
FIG. 2 illustrates a brief outline of control method of the numerical control device.
Figure 3:
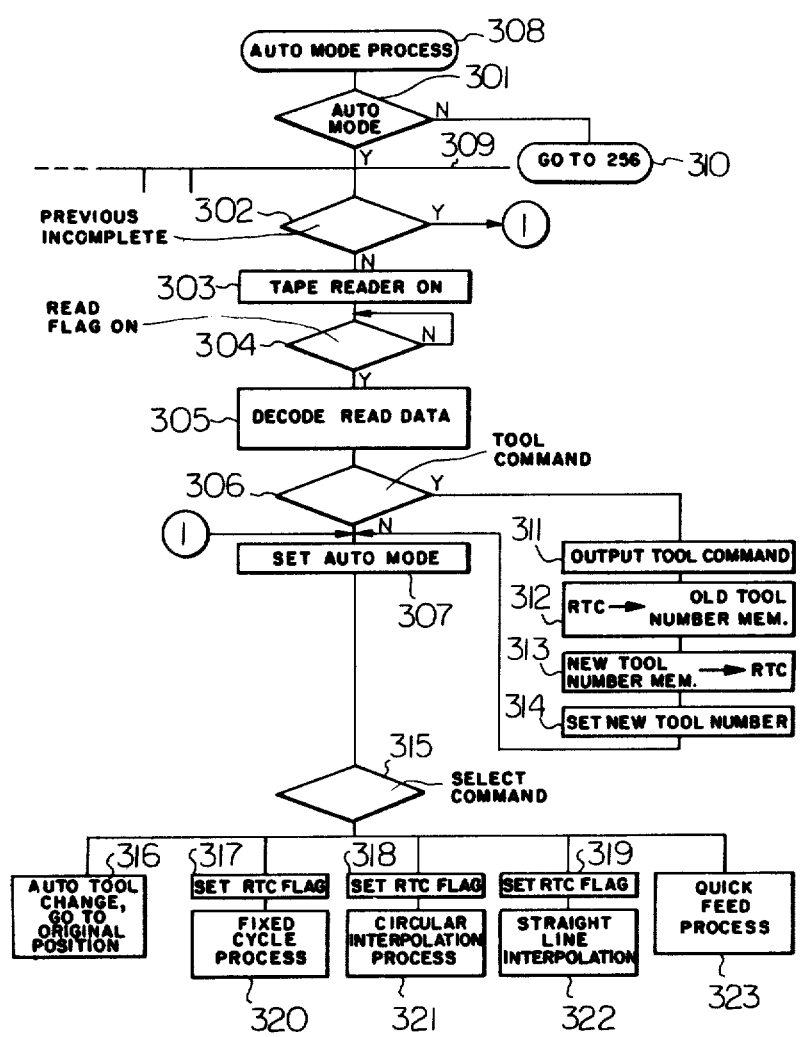
FIG. 3 and FIG. 4 illustrate automatic operation and interruption control respectively according to the control method related to the present invention.
Figure 4:
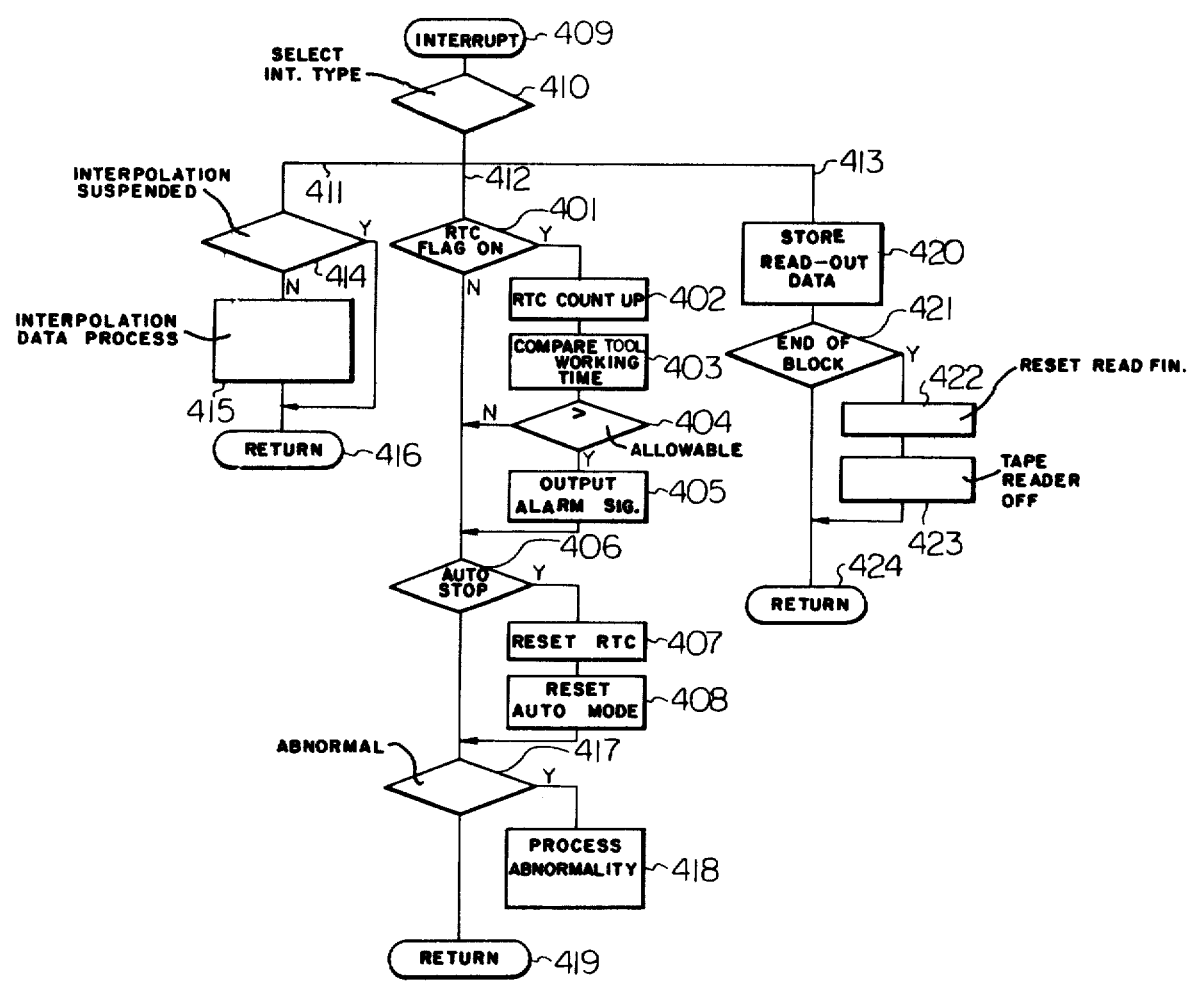

The tape reader 108 and the input operation device 204 are the input devices that provide the command information to the CPU 101. FIG. 2 is a flow chart outlining the control method of the aforementioned numerical control device. FIG. 3 and FIG. 4 illustrate a flow chart of automatic operation and interruption control by the control method that relates to the present invention.

The following is a description of an embodiment of the present invention with references made to the attached drawings. When power supply to the aforementioned numerical control device is turned on by the input operation device 204, the whole of the control unit is initialized at the Part 251 (FIG. 1), and the machine is set for operation. At the Part 252, nothing proceeds further until the input signal indicates a further advance. Supposing the operation push button that indicates the processing condition of the above mentioned control device is operated by the input operation device 204; the input signal changes, the CPU 101 receives the input via the control unit 106 and selects appropriate data from the data memory 103 and outputs said data to the display-alarm device 205 via the output control unit 107 and displays the data.

Similarly, when the CPU 101 receives the command to process the manual mode, it operates the interpolation pulse generator 105 to drive the spindle of the machine tool as commanded by the input operation device 204, and drives the servo-mechanism 201–203 and the drive motors 206–208, corresponding to the above command. To summarize, each box in FIG. 2 operates as follows. 250 is to start. 251 is to initialize. 252 detects a change of input signal. 253 detects the type of the new signal. 254 performs the process related to display receiving the display-related signals. 255 performs the process of automatic operation mode receiving the automatic operation related signals. 256 performs the process of manual mode receiving the manual mode related signals.

Now, before beginning the explanation of the flow-charts of FIG. 3 and FIG. 4, which relate to an automatic operation mode and an interruption operation, respectively, the operation of the boxes in those figures is listed below.

301; automatic operation mode ? (yes/no),
302; previous block incomplete ? (yes/no),
303; tape reader drive signal "on",
304; completed reading flag "on" ? (yes/no)
305; decoding read-out data,
306; tool command input ? (yes/no),
307; automatic operation flag is set,
308; process of automatic operation mode,
309; trigger signal for automatic operation "on",
310; go to 202 in FIG. 2,
311; tool command output to machine tool,
312; value of RTC memory to be stored in the memory of old tool number,
313; set the value in the new tool number memory into RTC memory,
314; set the new tool number,
315; types of shifting commands ?
316; automatic tool change and the process to return to the original position,
317, 318, and 319; RTC flag "on",
320; fixed cycle process,
321; circular interpolation process,
322; straight line interpolation process,
323; quick feed process,
401; RTC flag on ? (yes/no)
402; RTC memory count up,
403; allowable working time of tools used compared,
404; allowable time exceeded ? (yes/no),
405; alarm signal output,
406; automatic operation stop signal on ? (yes/no),
407; RTC flag off,
408; automatic operation flag reset,
409; interruption processing,
410; type of interruption,
411; interruption demanding interpolation data,
412; interruption of RTC,
413; interruption from tape reader,
414; interpolation suspended ? (yes/no),
415; interpolation data process,
416; return,
417; condition abnormal ? (yes/no),
418; abnormality process,
419; return,
420; read-out data is stored in the data storage memory,
421; is read-out data end of block ? (yes/no),
422; finished reading flag reset,
423; tape reader drive signal off,
424; return, When the CPU 101 receives the command to process the automatic operation mode, it judges if the Part 301 is in the automatic operation mode as illustrated in FIG. 3. If it is not in the automatic operation mode, the process is performed as commanded depending on the type of input signal. If it is in the automatic operation mode, and if the automatic operation-start push-button of the input operation device 204 is on, the process proceeds to Part 302 (FIG. 3). And, if there is a data block which had previously been suspended half-way, the work is performed according to the command of the block. If there is no block which has been suspended half-way, the processing advances to the Part 303 and drives the tape reader 108. At the Part 304, the command is looped until the tape-reader finishes reading and the flag is on. The "flag" here is defined as a characteristic indicating a specific condition. Typically, a specific bit of a specific address in the data memory is allocated to each flag. And, at this stage, each time one character of the command information is read from the tape reader 108, an interruption occurs. Therefore, the CPU 101 processes this interruption signal which is input via the interruption control unit 109. Thus, one block of data is read by the tape-reader 108 and the read-end flag is on.

Now, as illustrated in FIG. 4, the processing of interruption may be performed by the tape-reader 108 or by demand of interpolated data or by the RTC 110. If the processing is to be performed by RTC, among others, in a situation where the processing involves detection of an abnormal condition of the aformentioned control device or presence or absence of an emergency signal, then, this signal is normally arranged to cause an interruption, e.g. every 10 ms so that sufficient time to deal with the abnormal situation is available.

In addition to the processes described above, the present invention is characterized by having the numerical control device perform the following processes. Because of this characteristic, the real working time of machine tools and operating time of NC machine tools can now be obtained.

That is, in FIG. 3, the data read out by the Part 305 is decoded, and the Part 306 identifies presence or absence of tool command, and if present, the contents of the RTC memory, which is a part of the data memory, is stored in the "memory for the old tool number", the value of the "memory for new tool number" is stored in the RTC memory. Then, the RTC memory is counted by RTC signals. As will be explained later, therefore, while that tool is working, the working time for that tool is calculated. Further, as illustrated in FIG. 3, types of shifting commands that accompany tool processing are classified into straight line interpolation, circular interpolation, or fixed cycle, and the commands that do not accompany tool processing are those including quick-feeding, automatic return to the original position, or dwell. If the command is to accompany a tool processing, the RTC flag is set "on". Also in FIG. 4, in the case of an interruption process by RTC 110, the RTC flag judges on or off at the Part 401, and if on, it counts up RTC memory. Further, the value of the counted up RTC memory and the allowable working time of the currently used tool, which has previously been input from the input operation device 204 via the input control device 106, are compared by the CPU 101. If the value of the RTC memory is greater, warning is given by the display-alarm device (Part 403, 404 and 405). At the time of counting up the RTC memory, if the display unit operates on a per-minute basis, since the interruption of the RTC 110 is on the 10 ms basis, the 10 ms interruption signal is, of course, demultiplied. Although not illustrated in the drawings, in the interruption process by the RTC 110 illustrated in FIG. 4, the RTC flag judges the on/off condition of the automatically-operating flag set at the Part 307 of FIG. 3 and reset at the Part 408 of FIG. 4. If it is on, as already mentioned above, the automatically-operating time can be measured by counting up the value of the automatically-operating RTC memory, which is part of the data memory 103. At the same time, the time the power supply was on can be measured if the power-supply-on RTC memory, a separate but integral part of the data memory 103 is unconditionally counted up at each RTC interruption.

Further, in FIG. 3, after decoding the data read out at the Part 305, the presence or absence of MO3 (forward operation command for the main spindle) or MO4 (reverse operation command for the main spindle) code is judged. If present, the spindle-on-flag is set. Also, presence or absence of MO5 (the main spindle stop command) code is judged. If present, the spindle-on flag is reset. Only when the spindle-on-flag is on in the interruption process of the RTC 110 is FIG. 4 can the spindle revolution period be measured by adding that portion obtained by counting up the spindle-on-memory, a part of the data memory 103.

Apart from the method described earlier, in which warning is issued by the display-alarm device 205 when the allowable working time has exceeded the total working time of tool as identified through a comparison process of the CPU 101, there is another method described below. That is, the input value of the allowable working period for each tool number is set in the tool number memory which is a part of the data memory 103 mentioned earlier; and if the part 402 in FIG. 4 is changed to "RTC memory count down", the Part 403 to "compare RTC memory with a given value" and the Part 404 to "a given value exceeded ?" then, the values set in the tool number memory which is a part of the data memory 103, become "the balance of serviceable time" for each tool. At this stage, it is possible to impart some significance to the above given value such as "the remaining serviceable time for instructing tool change preparation" Or supposing the given value be made zero, it can indicate "the remaining serviceable time is zero".

Also, if arranged so that the values of various memories (forming a part of the data memory 103 which is capable of performing every type of RTC work and of displaying as described above) can be preset via the input control unit 106 through the input operation device 204 as preset data, and if, for example, zero is preset at the start of processing a part, the value of the memory that corresponds to each of the items described earlier at the end of processing of that particular part corresponds to the time of each item expended in order to process that particular part. Further, if the memory is of the type which maintains the contents of the data memory 103 even after the power supply has been cut, such as core memory or an IC memory with battery power supply, the value of each memory mentioned above can be maintained over a long period as an integrated value. The calculated value of each memory may be displayed by the display-alarm device 205 via the output control unit 107.

The tools described in the present invention are not limited to mere tools such as drills or bits, but are to include any means that will process workpieces, while the machines can be not only machine tools such as lathes or machining centers, but can be any type of machines which can shift the relative position of a tool, such as a marking-off cutter, and the workpiece.

As described above, according to the present invention, calculation of the net working time, display, and control of tools can be performed at low cost and in a practical way without adding high priced detectors or host computers as in the case of DNC. At the same time, it substantially reduces generation of faulty products resulting from improper tools. Measurement and display of time related to operation of other NC machine tools can be readily executed. Thus, the present invention presents a very effective means to obtain control data of NC machine tools.

The apparatus for performing the present invention can be implemented by using a micro-computer, for instance, TMS-9900 which is a 16-bit micro-computer manufactured by Texas Instruments Co., U.S.A. Of course specific hardware which has some flags, means corresponding to RTC and a display means can replace the programmed micro-computer.

From the foregoing it will now be apparent that a new and improved system for providing time control data has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A system for providing time control data in a numerical control system comprising data memory means having a plurality of flags, a flag being provided for every time control item and activated only when said item is in active operation, clock means for providing signals at predetermined intervals, input device means for inputting command information to said memory, display/alarm means for displaying content of said memory and giving warning, means for counting said clock when a flag in said memory is activated and applying result of the counting to said display/alarm means, and control means for controlling operation of the above elements.

2. The system of claim 1 wherein a flag is activated when a tool mounted in a machine tool is in active operation.

3. The system of claim 2 wherein said machine tool has a plurality of tools and the active operation of each tool is counted.

4. The system of claim 2 wherein the counted result of each tool is compared with the allowable working time of each tool stored in said memory, and when said counted result exceeds said allowable working time said display/alarm means providing warning.

5. The system of claim 2 wherein an allowable working time and a predetermined constant are stored in said memory, subtracting actual working time of each tool from said allowable working time, and when the difference reaches said predetermined constant said display/alarm means providing warning.

6. The system of claim 1 wherein a flag is activated upon application of power to said system, and another flag is activated upon said system being in the automatic operation mode.

7. The system of claim 1 wherein a flag is activated upon actual rotation of a machine tool spindle.

8. The system of claim 1 wherein said control means is a programmed micro-computer.

* * * * *